(12) United States Patent
Xu et al.

(10) Patent No.: US 9,382,480 B2
(45) Date of Patent: Jul. 5, 2016

(54) DICHROMATIC DYE COMPOSITION AND APPLICATION THEREOF

(71) Applicant: JIANGSU HECHENG DISPLAY TECHNOLOGY CO. LTD., Jiangsu (CN)

(72) Inventors: Haibin Xu, Jiangsu (CN); Yudong Tan, Jiangsu (CN); Zhaoyuan Chen, Jiangsu (CN); Feng Wu, Jiangsu (CN); Xiaofei She, Jiangsu (CN); Da Huang, Jiangsu (CN); Xiangfei Kong, Jiangsu (CN); Xiaolong Song, Jiangsu (CN); Shizhi You, Jiangsu (CN)

(73) Assignee: Jiangsu Hecheng Display Technology Co. Ltd., Jiangsu (CN)

( * ) Notice: Subject to any disclaimer, the term of this patent is extended or adjusted under 35 U.S.C. 154(b) by 0 days.

(21) Appl. No.: 14/408,020

(22) PCT Filed: May 31, 2013

(86) PCT No.: PCT/CN2013/000643
§ 371 (c)(1),
(2) Date: Dec. 15, 2014

(87) PCT Pub. No.: WO2013/185475
PCT Pub. Date: Dec. 19, 2013

(65) Prior Publication Data
US 2015/0218455 A1    Aug. 6, 2015

(30) Foreign Application Priority Data
Jun. 13, 2012  (CN) .......................... 2012 1 0194735

(51) Int. Cl.
| | | |
|---|---|---|
| G02F 1/1333 | (2006.01) | |
| C09K 19/52 | (2006.01) | |
| G02F 1/137 | (2006.01) | |
| C09K 19/60 | (2006.01) | |
| C09B 67/22 | (2006.01) | |
| C09K 19/58 | (2006.01) | |

(52) U.S. Cl.
CPC ............. *C09K 19/52* (2013.01); *C09B 67/0034* (2013.01); *C09B 67/0046* (2013.01); *C09K 19/586* (2013.01); *C09K 19/601* (2013.01); *C09K 19/603* (2013.01); *G02F 1/13725* (2013.01); *C09K 2019/523* (2013.01)

(58) Field of Classification Search
CPC ... G02F 1/1333; G02F 1/13725; C09K 19/52; C09K 19/601; C09K 19/603; C09K 19/586; C09K 2019/523; C09B 67/0034; C09B 67/0046
USPC ........................................ 252/299.5; 349/182
See application file for complete search history.

(56) References Cited

U.S. PATENT DOCUMENTS

| | | | |
|---|---|---|---|
| 6,039,893 | A  | 3/2000  | Arakawa et al. |
| 7,754,295 | B2 | 7/2010  | Chari et al. |
| 7,857,991 | B2 | 12/2010 | Shiga et al. |

FOREIGN PATENT DOCUMENTS

| | | |
|---|---|---|
| CN | 101235220 A | 8/2008 |
| CN | 101371187 A | 2/2009 |
| CN | 101698802 A | 4/2010 |
| JP | S58109579 A | 6/1983 |

*Primary Examiner* — Geraldina Visconti
(74) *Attorney, Agent, or Firm* — Laurence A. Greenberg; Werner H. Stemer; Ralph E. Locher

(57) ABSTRACT

A dichromatic dye composition which has the characteristics of higher order parameter and good miscibility can be applied in a guest-host liquid crystal composition. The absorbance curve of a guest-host liquid crystal composition with the dichromatic dye composition within the range of 420-680 nm has the following characteristics: a. $2 \leq (T_1+T_2)/\Delta T \leq 10$; b. $|T_1-T_2| \leq 0.5$; c. $0 < \Delta T \leq 0.2$, where $T_1$ is a difference between a transmittance to light at 420 nm and a minimum transmittance, $T_2$ is a difference between the transmittance at a wavelength of 680 nm and a minimum transmittance, and $\Delta T$ is a difference between the maximum and minimum transmittances on the transmittance curve within the wavelength range of 420-680 nm. A liquid crystal element with the guest-host liquid crystal composition provides a high-contrast display. A liquid crystal display device has the guest-host liquid crystal composition with the dichromatic dye composition.

14 Claims, 2 Drawing Sheets

DICHROMATIC DYE COMPOSITION AND APPLICATION THEREOF

TECHNICAL FIELD

The invention relates to a dichromatic dye composition, in particular, relates to a dichromatic dye composition used in a guest-host liquid crystal composition and application thereof.

BACKGROUND

Liquid crystal material is a material in a liquid crystalline state which is between the solid state and the liquid state. The phase states of a liquid crystal material can be roughly classified into nematic phase, smectic phase and cholesteric phase. Liquid crystal materials can be classified into dynamic scattering mode (DS), guest-host mode (GH), twisted nematic mode (TN), super twisted nematic mode (STN), vertical alignment mode (VA) and the like. Liquid crystal elements formed by sandwiching the liquid crystal composition between two electrodes can be widely used in display devices such as electronic calculators, various test instruments, car dashboards, computers, laptops, mobile phones, televisions and the like, and dimming devices such as 3D glasses, motor vehiclrearview mirrors, light valves for welding, camera viewfinders and the like, due to the specific electro-optics properties thereof.

Linear polarizers are required for most liquid crystal elements for obtaining polarized light, resulting in utilization of light inefficient. Due to the dichroism (also known as absorption anisotropy, i.e. different absorbances are shown to polarized light perpendicular to or parallel to the absorption axis of the dichromatic dye) derived from the dichromatic dye, the liquid crystal elements comprising the dichromatic dye contained in a liquid crystal composition (i.e. a guest-host liquid crystal composition) can realize monochrome or multi-color display with fewer or without any polarizer, has higher luminance and display contrast and wide viewing angle, and can eliminate chromatic aberration. In particular, light emitting display can also be realized by the liquid crystal elements in reflection mode without backlight, and the utilization of light is efficient.

Most dichromatic dyes are anthraquinone dyes or azo dyes. A single dichromatic dye mainly absorbs the light with particular wavelength and shows the complimentary color of the transmit light, since different substituent groups in the dye molecules show different absorption characteristics to visible light. For example, dyes mainly absorbing red, yellow, green and blue colored light respectively will show the colors of blue, purple, red and yellow, respectively. Therefore, it is difficult for a single dichromatic dye to show a color of black. Therefore, mixtures of multiple dyes are required to obtain an absorbance to the visible light that is a constant; meanwhile, according to the sensitivity of human eyes to light, only a uniform absorption to the light with wavelength ranged from 420 nm to 680 nm can create a color called black.

If the absorption to light occurs when the direction of vibration of the polarized light is consistent with the direction of long axis of the dye molecule, the dye can be called a positive dye (P-type dye). If the absorption to light does not occur when the direction of vibration of the polarized light is consistent with the direction of long axis of the dye molecule, the dye can be called a negative dye (N-type dye). Since the species of dichroism N-type dyes only are half of that of the dichroism P-type dyes, generally, most are P-type dyes.

As for the guest-host liquid crystal composition comprising dichromatic dye, the more uniformly it absorbs the light with wavelength ranged from 420 nm to 680 nm, the more uniformly the transmittance curve distributes, and thus the better effect of displaying the color of black the display device gets. Therefore, a dichromatic dye is required to exhibit good and uniformly absorption property to the light with wavelength ranged from 420 nm to 680 nm and the properties such as high solubility and the like. Relative to the properties such as contrast, color reproduction and the like of the guest-host liquid crystal composition, transmittance and solubility of the dichromatic dye in the liquid crystal have a great effect on the display quality of guest-host display device. The contrast can be improved by increasing the concentration of the dichromatic dye at the cost of light emission display, a characteristic of guest-host display device. Therefore, the above two characteristics, i.e. low transmittance and high solubility, are required to be maintained in both dichromatic dye and host liquid crystal. However, transmittance of the dichromatic-dye-contained liquid crystals currently commercially available is higher, and distribution of the transmittance curve thereof is nonuniform, and thus it is difficult to arrive at a good effect of displaying the color of black.

Therefore, a dichromatic dye composition with low transmittance and good miscibility is in particular need in liquid crystal material art. In particular, in order to arrive at the effect of displaying the color of black, a dichromatic dye composition having good absorption to lights with wavelength ranged from 420 to 680 nm is needed.

SUMMARY OF THE INVENTION

The invention aims to provide a dichromatic dye composition with the characteristics of high order parameter and good miscibility. Also, a guest-host liquid crystal composition comprising the dichromatic dye composition is provided. The guest-host liquid crystal composition comprising the dichromatic dye composition has good absorption to lights with wavelength ranged from 420 to 680 nm, and thus a high-contrast display can be realized by the liquid crystal element comprising the guest-host liquid crystal composition.

Provided herein is a dichromatic dye composition. The absorbance curve of guest-host liquid crystal composition containing the dichromatic dye composition has the following characteristics within the range of 420-680 nm:

a. $2 \le (T_1+T_2)/\Delta T \le 10$;

b. $|T_1-T_2| \le 0.5$;

c. $0 < \Delta T \le 0.2$;

in which, $T_1$ is the difference between the transmittance to the light with the wavelength of 420 nm and the minimum transmittance on the transmittance curve;

$T_2$ is the difference between the transmittance at the wavelength of 680 nm and the minimum transmittance on the transmittance curve;

$\Delta T$ is the difference between the maximum and the minimum transmittances on the transmittance curve within the wavelength range of 420-680 nm.

Any guest-host liquid crystal composition that is formed by the dichromatic dye composition and a different host liquid crystal has said characteristics, in which the dichromatic dye composition and the host liquid crystal are soluble with each other.

In order to accomplish the aim of the invention, the invention provides a dichromatic dye composition, based on the total weight of the dichromatic dye composition, comprising:

(1) 0%-50% of one or more compounds of formula (I)

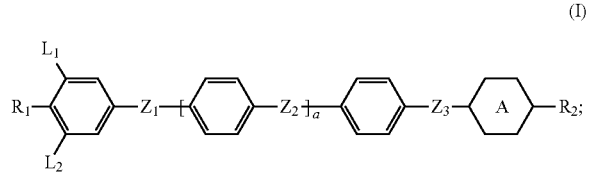
(I)

(2) 5%-85% of one or more compounds of formula (II)

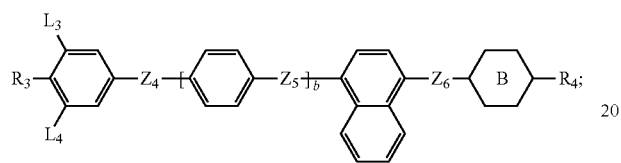
(II)

(3) 0%-95% of one or more compounds of formula (III)

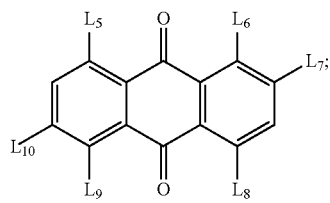
(III)

in which, $R_1$ and $R_3$ can be same or different, and are independently selected from a group consisting of —H, —F, —$NO_2$, —$NH_2$, —$SO_2R$, —SR, $C_{1-12}$ alkyl and $C_{1-12}$ alkoxy, in which one of more H of the $C_{1-12}$ alkyl and the $C_{1-12}$ alkoxy can be independently substituted by F, H of the —$NH_2$ can be each independently substituted by $C_{1-12}$ alkyl;

$R_2$ is selected from a group consisting of —H, —F, —$NO_2$, —$NH_2$, —$SO_2R$, —SR, $C_{1-12}$ alkyl and $C_{1-12}$ alkoxy; in which one or more H of the $C_{1-12}$ alkyl and the $C_{1-12}$ alkoxy can be independently substituted by F, and —H of the —$NH_2$ can be each, independently substituted by Ra or Ra'; the Ra and Ra' can be same or different, and independently are $C_{1-10}$ alkyl, in which one or more H of the $C_{1-10}$ alkyl can be independently substituted by F;

$R_4$ is selected from a group consisting of —H, —F, —$NO_2$, —$NH_2$, —$SO_2R$, —SR, $C_{1-12}$ alkyl and $C_{1-12}$ alkoxy; in which one or more H of the $C_{1-12}$ alkyl and the $C_{1-12}$ alkoxy can be independently substituted by F, and H of the —$NH_2$ can be each, independently, substituted by Rb or Rb; the Rb and Rb' can be same or different, and independently are $C_{1-10}$ alkyl, in which one or more H of the $C_{1-10}$ alkyl can be independently substituted by F;

R is $C_{1-12}$ alkyl with or without halogenation;

$Z_1$, $Z_2$, $Z_3$, $Z_4$, $Z_5$ and $Z_6$ can be same or different, and independently are selected from a group consisting of single bond, —COO—, —OCO—, —N=N—, —CH=N—, —CH=CH—, —CF=CF—, —$CF_2O$— and —C≡C—;

$L_1$, $L_2$, $L_3$ and $L_4$ can be same or different, and independently are selected from a group consisting of —H, —F, $C_{1-12}$ alkyl and $C_{1-12}$ alkoxy, in which one or more H of the $C_{1-12}$ alkyl and the $C_{1-12}$ alkoxy can be independently substituted by F;

$L_5$, $L_6$, $L_7$, $L_8$, $L_9$ and $L_{10}$ can be same or different, and independently are selected from a group consisting of hydroxyl, amino, $C_{1-15}$ alkyl, $C_{1-15}$ alkoxy,

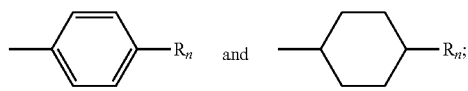

in which H of the hydroxyl and the amino can be each, independently, substituted by

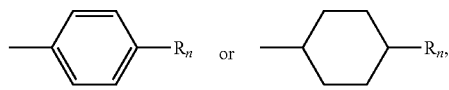

and one or more H of the $C_{1-15}$ alkyl and the $C_{1-15}$ alkoxy can be independently substituted by F or Cl; $R_n$ is selected from a group consisting of $C_{1-15}$ alkyl or alkoxy and $C_{2-14}$ alkenyl or alkynyl, in which one or more H of the $C_{1-15}$ alkyl or alkoxy and the $C_{2-14}$ alkenyl can be each, independently, substituted by F or Cl;

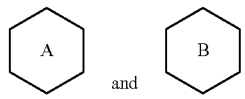

can be same or different, and each, independently are selected from a group consisting of

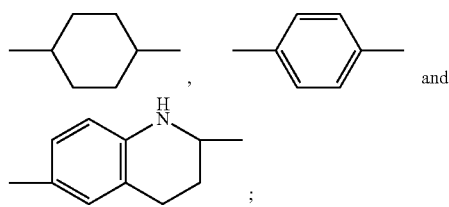

in which one or more nonadjacent —$CH_2$— of the

can be independently replaced by O, one or more H of the

can be independently substituted by halogen or $C_{1-10}$ alkyl;
a and b each are 0, 1 or 2.

In the embodiments of the invention, the compound of formula (I) is preferably one or more compounds selected from a group consisting of following compounds:

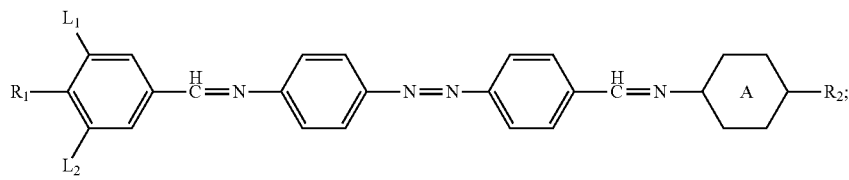
(I-1)
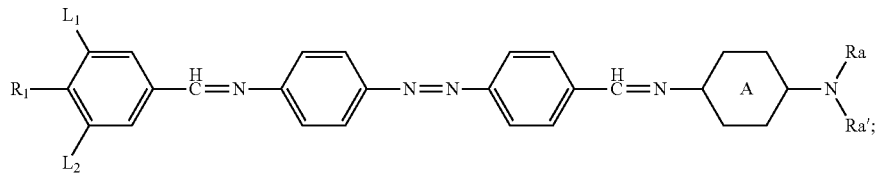
(I-2)
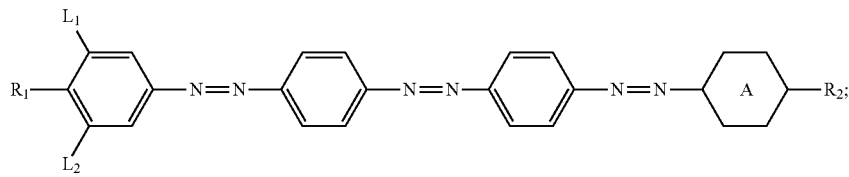
(I-3)
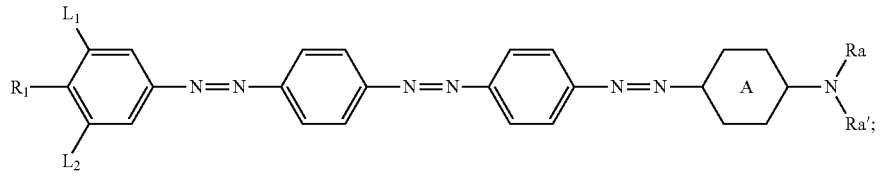
(I-4)
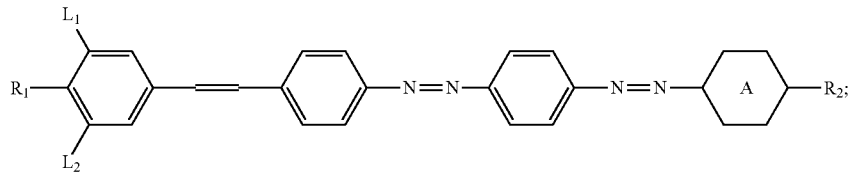
(I-5)
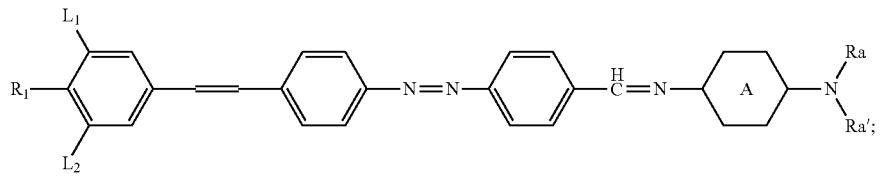
(I-6)
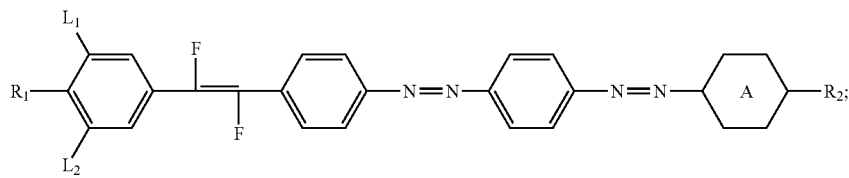
(I-7)
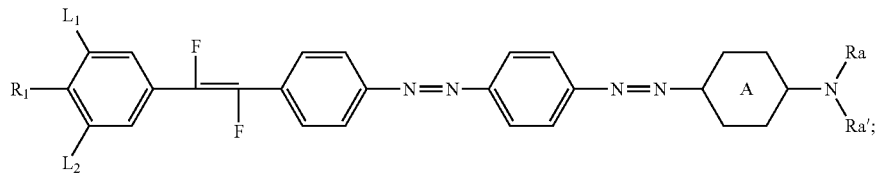
(I-8)

-continued (I-9)
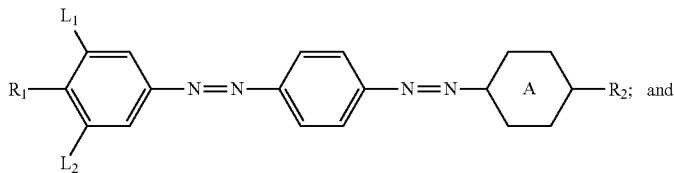

(I-10)
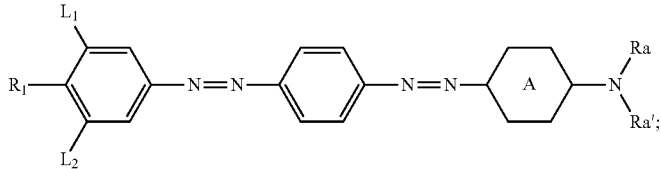

in which, $R_1$ is selected from a group consisting of —H, —F, —NO$_2$, —NH$_2$, —SO$_2$R, —SR, C$_{1-8}$ alkyl and C$_{1-8}$ alkoxy; in which one or more H of the C$_{1-8}$ alkyl and the C$_{1-8}$ alkoxy can be independently substituted by F, and H of the —NH$_2$ can be each, independently, substituted by C$_{1-8}$ alkyl;

$R_2$ is selected from a group consisting of —H, —F, —SO$_2$R, C$_{1-8}$ alkyl and C$_{1-8}$ alkoxy; in which one or more H of the C$_{1-8}$ alkyl and the C$_{1-8}$ alkoxy can be independently substituted by F;

R is C$_{1-10}$ alkyl with or without fluoro-substitution;

Ra and Ra' can be same or different, and each, independently, are C$_{1-8}$ alkyl, in which one or more H of C$_{1-8}$ alkyl can be independently substituted by F;

$L_1$ and $L_2$ can be same or different, and each, independently, are selected from a group consisting of —H, —F, C$_{1-6}$ alkyl and C$_{1-6}$ alkoxy; in which one or more H of the C$_{1-6}$ alkyl and the C$_{1-6}$ alkoxy can be independently substituted by F;

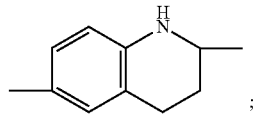

is

-continued

in which one or more H of the

can be independently substituted by F or C$_{1-6}$ alkyl.

In the embodiments of the invention, the compound of formula (II) is preferably one or more compounds selected from a group consisting of following compounds:

(II-1)
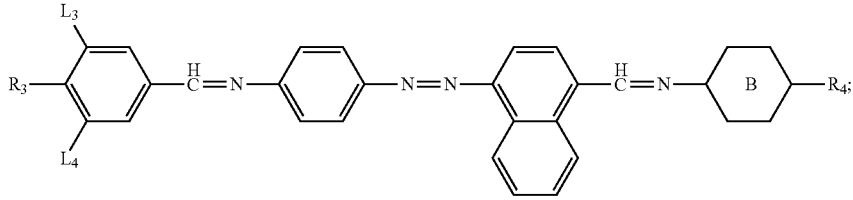

(II-2)
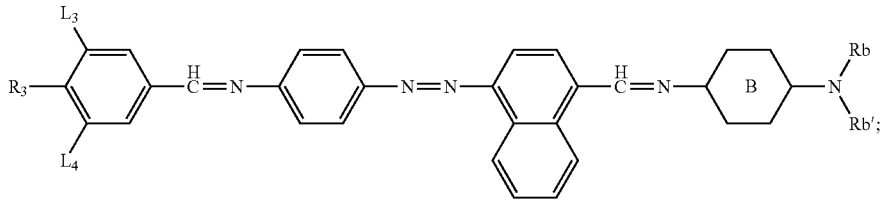

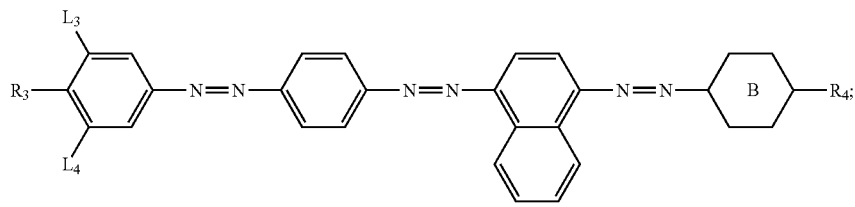
(II-3)
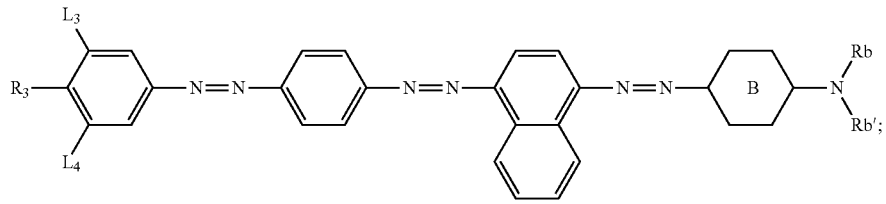
(II-4)
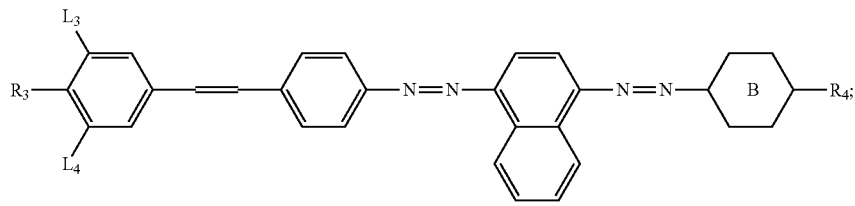
(II-5)
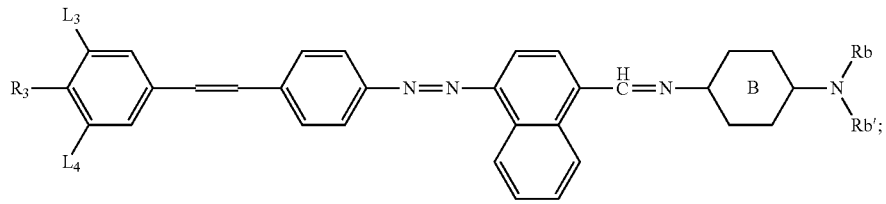
(II-6)
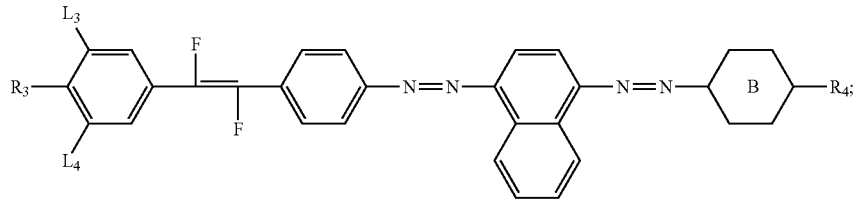
(II-7)
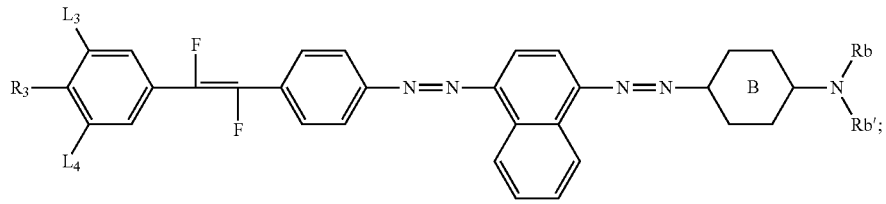
(II-8)
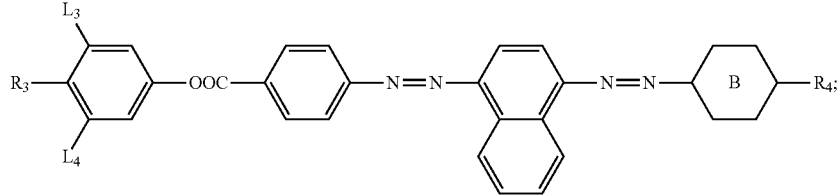
(II-9)

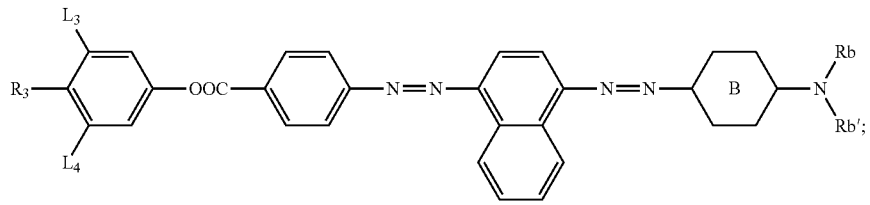
(II-10)

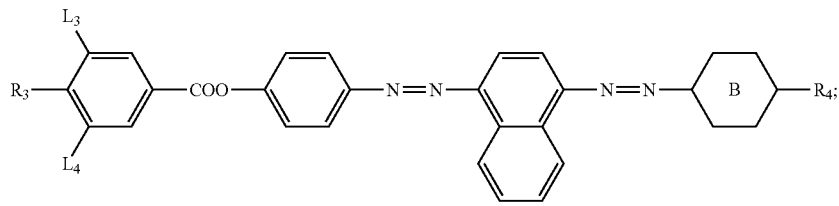
(II-11)

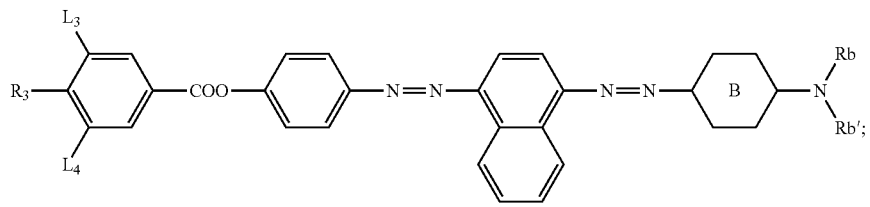
(II-12)

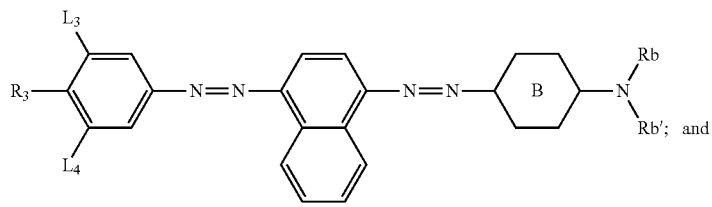
(II-13)

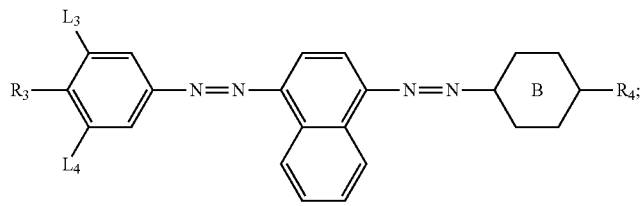
(II-14)

In which, $R_3$ is selected from a group consisting of —H, —F, —NO$_2$, —NH$_2$, —SO$_2$R, —SR, $C_{1-8}$ alkyl and $C_{1-8}$ alkoxy; in which one or more H of the $C_{1-8}$ alkyl and the $C_{1-8}$ alkoxy can be independently substituted by F, and H of the —NH$_2$ can be each, independently, substituted by $C_{1-8}$ alkyl;

$R_4$ is selected from a group consisting of —H, —F, —SO$_2$R, $C_{1-8}$ alkyl and $C_{1-8}$ alkoxy; in which one or more H of the $C_{1-8}$ alkyl and the $C_{1-8}$ alkoxy can be independently substituted by F;

R is $C_{1-10}$ alkyl with or without fluoro-substitution;

Rb and Rb' can be same or different, and each, independently, are $C_{1-8}$ alkyl, in which one or more H of $C_{1-8}$ alkyl can be independently substituted by F;

$L_3$ and $L_4$ can be same or different, and each, independently, are selected from a group consisting of —H, —F, $C_{1-6}$ alkyl and $C_{1-6}$ alkoxy; in which one or more H of the $C_{1-6}$ alkyl and the $C_{1-6}$ alkoxy can be independently substituted by F;

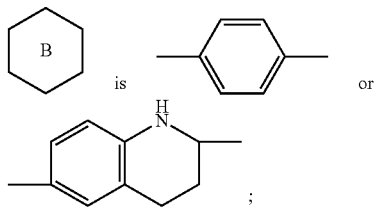

in which one or more H of the

can be independently substituted by F or $C_{1-6}$ alkyl.

In the embodiments of the invention, the compound of formula (III) is preferably one or more compounds selected from a group consisting of following compounds:

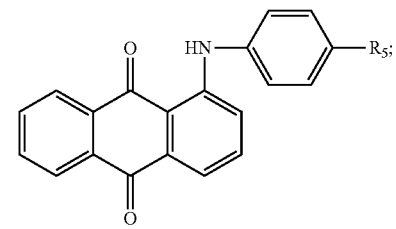
(III-1)

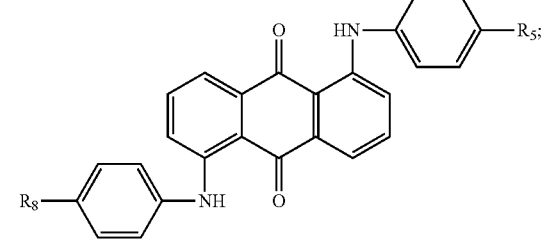
(III-2)

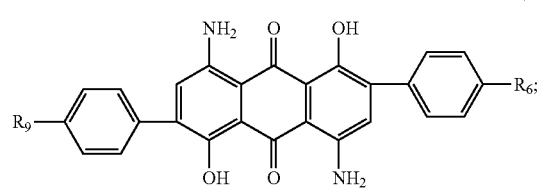
(III-3)

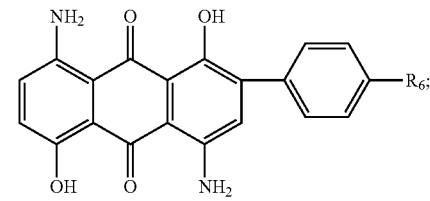
(III-4)

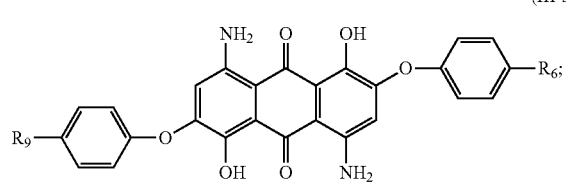
(III-5)

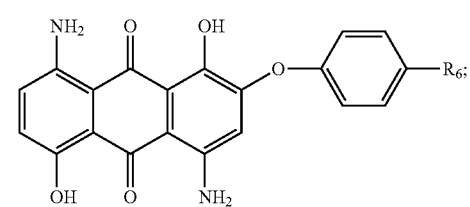
(III-6)

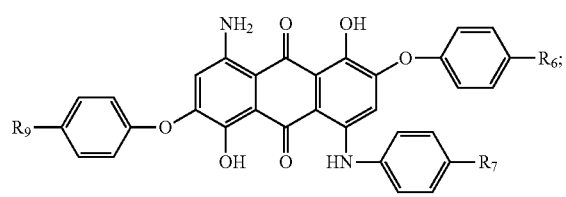
(III-7)

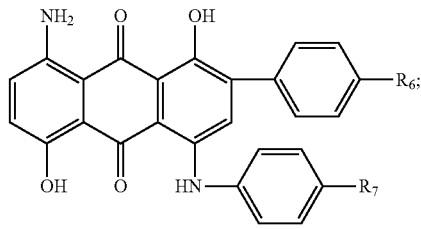
(III-8)

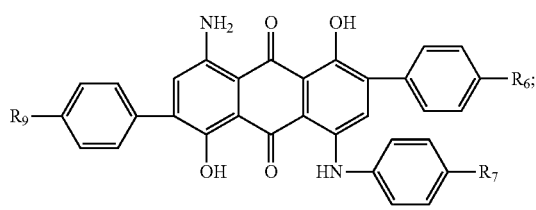
(III-9)

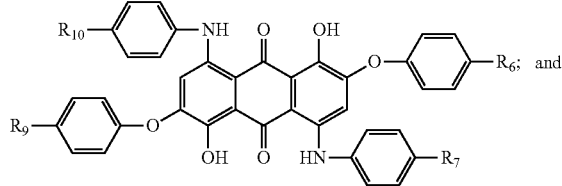
(III-10)

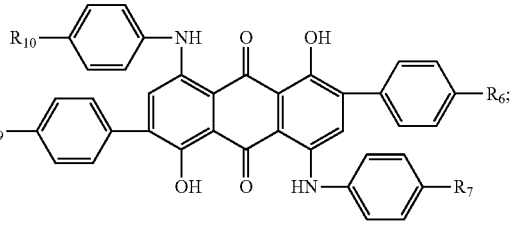
(III-11)

In which, $R_5$, $R_6$, $R_7$, $R_8$, $R_9$ and $R_{10}$ can be same or different, and each, independently, are selected from a group consisting of $C_{1-10}$ alkyl, $C_{1-10}$ alkoxy, $C_{2-10}$ alkenyl and $C_{2-10}$ alkynyl.

The dichromatic dye composition comprises 0%-40% of the compound of formula (I), 10%-80% of the compound of formula (II), and 0%-90% of the compound of formula (III), by the weight of the total weight of the dichromatic dye composition.

Also provided herein is a guest-host liquid crystal composition comprising the dichromatic dye abovementioned and a host liquid crystal, in which the dichromatic dye composition accounts for 0.1-10%, preferably, 0.5-5% of the total weight of the guest-host liquid crystal composition.

The dichromatic dye composition of the invention has the advantages of low transmittance in the guest-host display device, and high solubility in the host liquid crystal. A high contrast display can be realized when the guest-host liquid crystal composition formed by the dichromatic dye composition along with the host liquid crystal is used in liquid crystal elements.

The host liquid crystal of the guest-host liquid crystal composition of the invention may be the liquid crystal composition with either a negative dielectric anisotropy or a positive dielectric anisotropy. There are two things to note, one is that all the host liquid crystals used in the invention are commercially available, and the other is that the guest-host liquid crystal composition of the invention, based on different host liquid crystal used therein, can be used in the liquid crystal elements in different modes, and thus can be widely used.

The guest-host liquid crystal composition of the invention further comprises chiral dopants, the amount of which is 0 to 5% by the weight of guest-host liquid crystal composition.

The chiral dopants abovementioned mainly comprise but not limited to the following substances:

are possible without departing from the subject matter and scope of the present invention.

Unless otherwise stated, in the context of the invention, all the temperatures are Celsius temperature, and all the percentages are weight percentages.

All the ingredients used in the following Examples can be synthesized through the methods well-known, or can be obtained commercially. The synthetic techniques are conven-

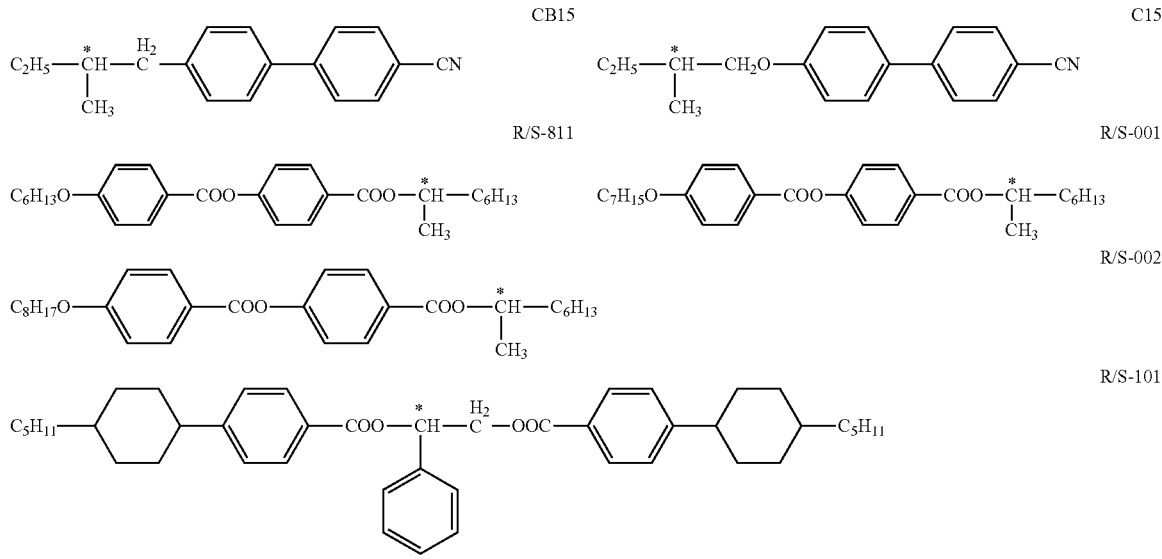

The guest-host liquid crystal compositions of the invention may further comprise additives, which are well-known to those skilled in the art or described in any documents published, such as anti-coagulating agent, anti-UV agent, antistatic agent and so forth.

The elements comprising the guest-host liquid crystal involved in the invention refer to various display devices and dimming devices having the dichromatic dye liquid crystal composition sandwiched between a pair of electrode substrate, including but not limited to vehicle-mounted display devices, three dimensional display devices, motor rearview mirrors, light valves for welding, camera viewfinders and so forth.

BEST MODE FOR CARRYING OUT THE INVENTION

The present invention will be illustrated by combining the detailed embodiments below. It should be noted that, the following examples are exemplary embodiments of the present invention, which are only used to illustrate the present invention, not to limit it. Other combinations and various modifications within the conception of the present invention tional, and test results show that the liquid crystal compounds obtained therefrom accord with the quality standard for electronic compounds.

Liquid crystal compositions are prepared according to the formulation of the composition of each Example. The preparation of liquid crystal compositions is based on routine methods in the art, such as heating, ultrasonic, suspending, and so forth.

The dichromatic dye liquid crystal composition and the liquid crystal elements thereof are evaluated in the following ways:

(1) Test for low-temperature storage stability of the host liquid crystal composition relevant to the dichromatic dye composition:

Dichromatic dye compositions as described in the Examples are prepared, and each is mixed with a host liquid crystal composition well by ways of heating, ultrasonic, suspending and so forth. The mixtures are allowed to cool to room temperature prior to being restored at temperature of −30. Precipitates will be observed visually, if occurs.

(2) Absorption curve of the dichromatic dye composition:

Dichromatic dye compositions as described in the Examples are prepared, and each is mixed with a host liquid crystal composition well by ways of heating, ultrasonic, suspending and so forth. The mixtures are allowed to cool to room temperature prior to being injected into the gap between two pieces of glass which have antiparallel alignment on their surfaces. Transmittances to light with different wavelengths within the range from 380 nm to 780 nm are tested.

EXAMPLE 1

1.575 g of Dichromatic dye composition 1 with the following components is dissolved in 100 g of host liquid crystal composition to obtain guest-host liquid crystal composition 1. The host liquid crystal is "MLC-2039" (trade name) from Merck Ltd. in Japan.

The components of the dichromatic dye composition 1 are:

(1) 38.1% by the weight of the dichromatic dye composition 1 of compound (II-1):

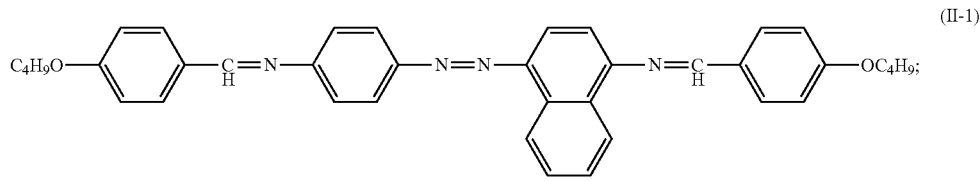

(2) 33.3% by the weight of the dichromatic dye composition 1 of compound (III-1):

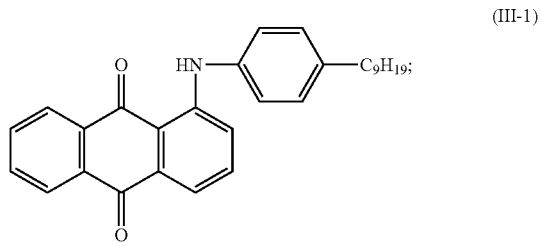

and (3) 28.6% by the weight of the dichromatic dye composition 1 of compound (III-8):

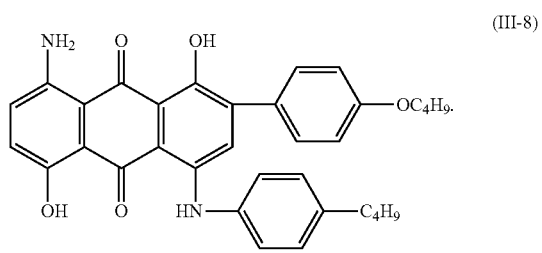

Figure 1:
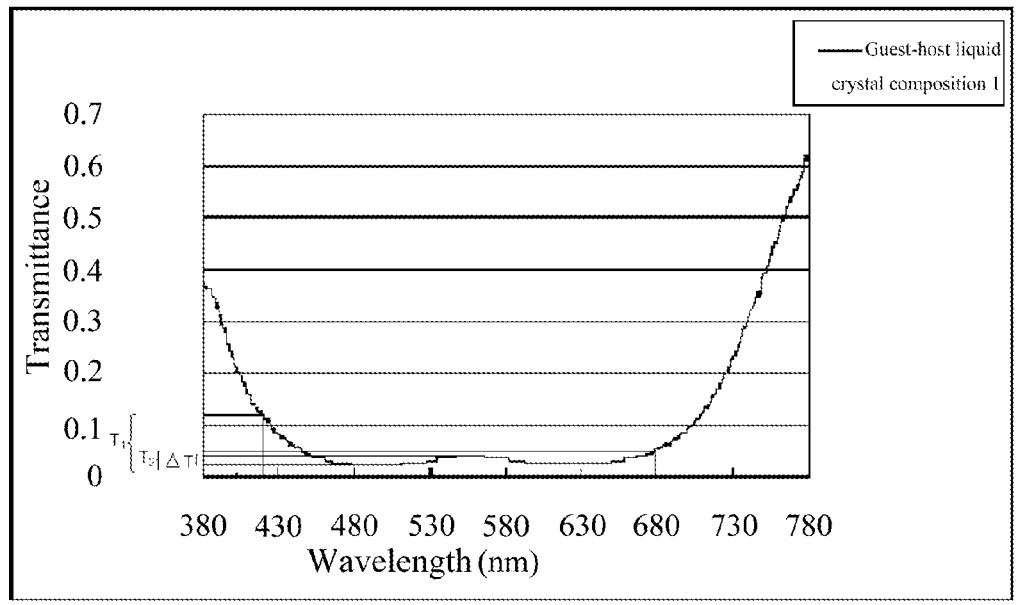
FIG. 1 is the absorption curve of guest-host liquid crystal composition 1.

The guest-host liquid crystal composition 1 is injected into the gap between two pieces of glass which have antiparallel alignment on their surfaces. The transmittances of light with different wavelengths within the range of 380-780 nm are shown in FIG. 1. As shown in FIG. 1, the guest-host liquid crystal composition 1 has a uniform absorption to lights with wavelengths ranged from 420 nm to 680 nm, therefore, a high-contrast display can be realized by the guest-host liquid crystal elements thereof.

The low-temperature storage stability of the guest-host liquid crystal composition 1 is tested, and no precipitate is found. Therefore, the low-temperature storage stability of guest-host liquid crystal composition 1 comprising the dichromatic dye composition 1 is considered good.

EXAMPLE 2

1.5 g of dichromatic dye composition 2 with the following components is dissolved in 100 g of host liquid crystal composition to obtain guest-host liquid crystal composition 2. The host liquid crystal is "MLC-2039" (trade name) from Merck Ltd. in Japan.

The components of the dichromatic dye composition 2 are:

(1) 20.0% by the weight of the dichromatic dye composition 2 of compound (II-1):

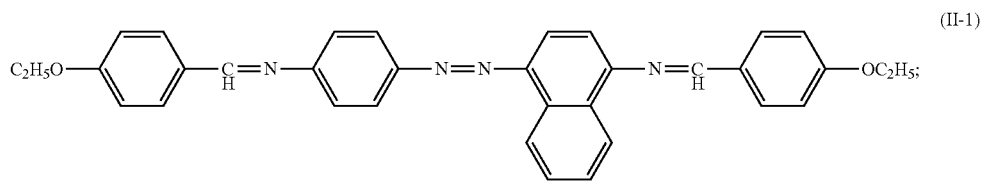

(2) 45.0% by the weight of the dichromatic dye composition 2 of compound (III-5):

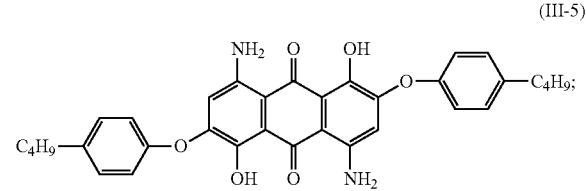

and (3) 35.0% by the Weight of the dichromatic dye composition 2 of compound (III-4):

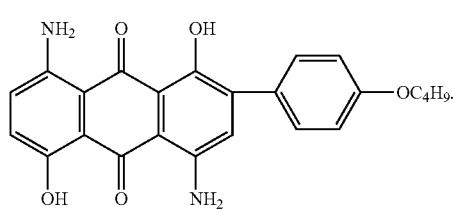

(2) 15.0% by the weight of the dichromatic dye composition 3 of compound (II-13):

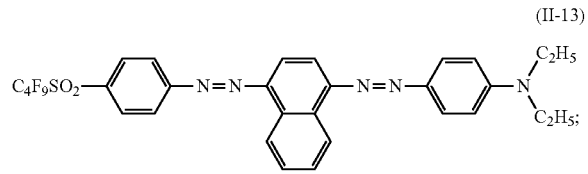

and (3) 55.0% by the weight of the dichromatic dye composition 3 of compound (II-3):

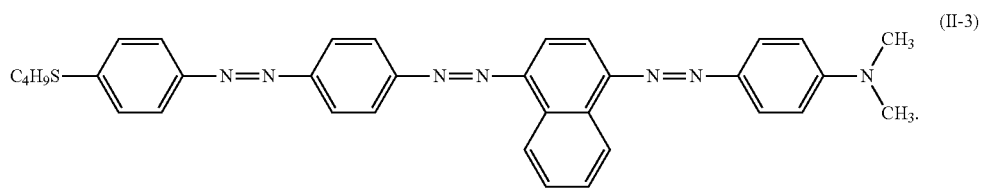

Figure 2:
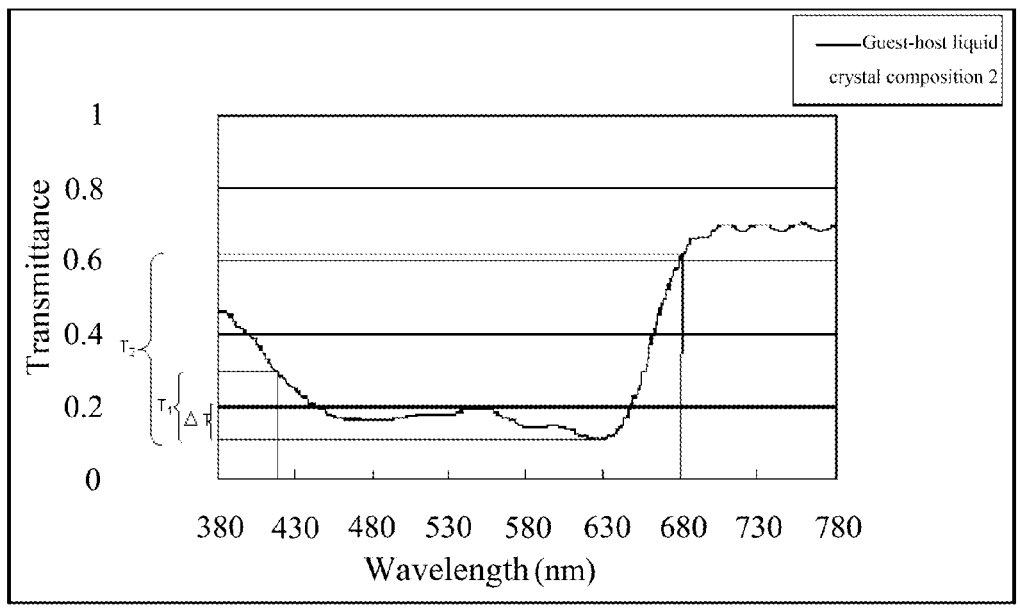
FIG. 2 is the absorption curve of guest-host liquid crystal composition 2.

The guest-host liquid crystal composition 2 is injected into the gap between two pieces of glass which have antiparallel alignment on their surfaces. The transmittances of light with different wavelengths within the range of 380-780 nm are shown in FIG. 2. As shown in FIG. 2, the guest-host liquid crystal composition 2 has a uniform absorption to lights with wavelengths ranged from 430 nm to 660 nm, therefore, a high-contrast display can be realized by the guest-host liquid crystal elements thereof. The low-temperature storage stability of the guest-host liquid crystal composition 2 is tested, and no precipitate is found. Therefore, the low-temperature storage stability of guest-host liquid crystal composition 2 comprising the dichromatic dye composition 2 is considered good.

EXAMPLE 3

2.0 g of dichromatic dye composition 3 with the following components is dissolved in 100 g of host liquid crystal composition to obtain guest-host liquid crystal composition 3. The host liquid crystal is "MLC-2039" (trade name) from Merck Ltd. in Japan.

The components of the dichromatic dye composition 3 are:

(1) 30.0% by the weight of the dichromatic dye composition 3 of compound (I-10):

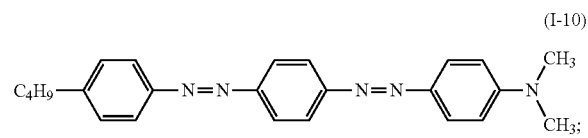

Figure 3:
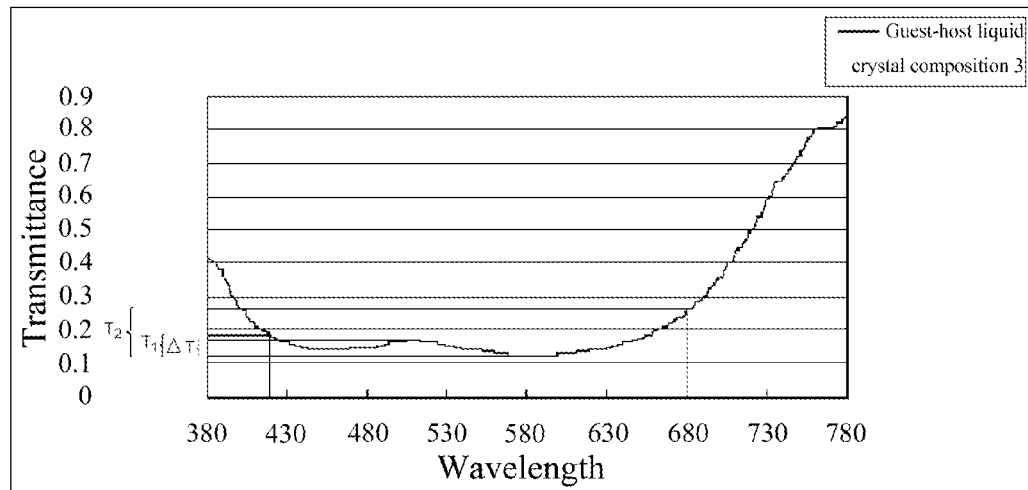
FIG. 3 is the absorption curve of guest-host liquid crystal composition 3.

The guest-host liquid crystal composition 3 is injected into the gap between two pieces of glass which have antiparallel alignment on their surfaces. The transmittances of light with different wavelengths within the range from 380 nm to 780 nm are shown in FIG. 3. As shown in FIG. 3, the guest-host liquid crystal composition 3 has a uniform absorption to lights with wavelengths ranged from 430 nm to 630 nm, therefore, a high-contrast display can be realized by the guest-host liquid crystal elements thereof.

The low-temperature storage stability of the guest-host liquid crystal composition 3 is tested, and no precipitate is found. Therefore, the low-temperature storage stability of guest-host liquid crystal composition 3 comprising the dichromatic dye composition 3 is considered good.

COMPARISON EXAMPLE 1

A commercially available dichromatic dye composition XXX44200-000 (trade name) is dissolved in 100 g of host liquid crystal composition to obtain guest-host liquid crystal composition 4. The host liquid crystal is "MLC-2039" (trade name) from Merck Ltd. in Japan.

Figure 4:
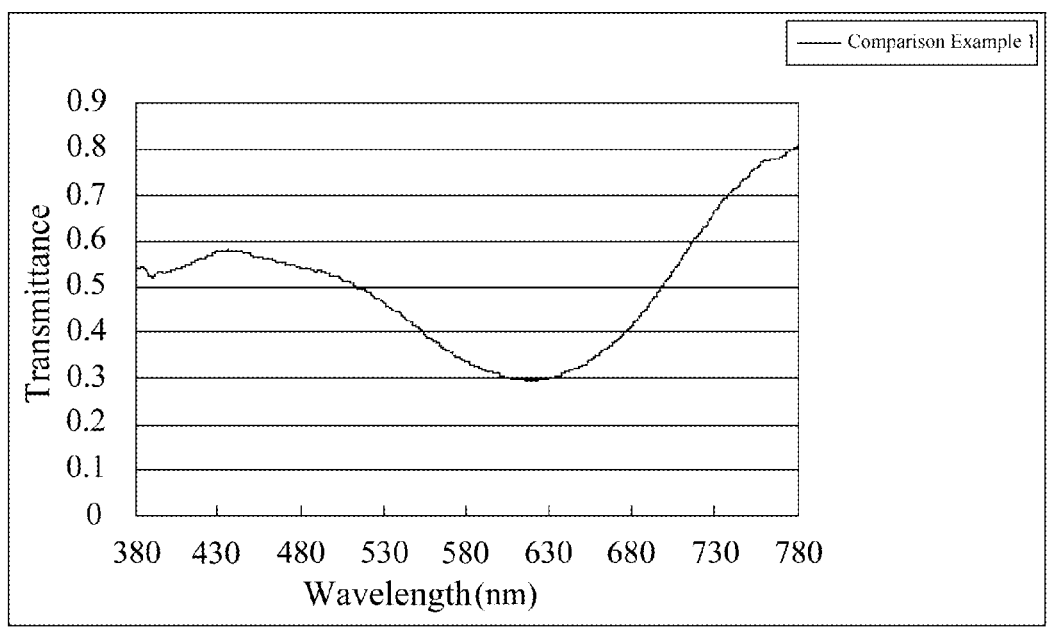
FIG. 4 is the absorption curve of guest-host liquid crystal composition 4.

The guest-host liquid crystal composition 4 is injected into the gap between two pieces of glass which have antiparallel alignment on their surfaces. The transmittances of light with different wavelengths within the range of 380-780 nm are shown in FIG. 4.

By comparing the transmittance curves shown in FIGS. 1, 2, 3 and 4, it can be seen, as compared with Comparison Example 1, the transmittance curves of Examples 1, 2 and 3 show a uniform absorption to light with wavelength ranged from 420 nm to 680 nm; therefore, the liquid crystal devices get a preferable effect of displaying a color of black.

What is claimed is:
1. A dichromatic dye composition, comprising:
   one or more compounds forming the dichromatic dye composition,
   wherein, based on a total weight of the dichromatic dye composition, the dichromatic dye composition comprises:

(1) 0%-50% by weight of one or more compounds of formula (I)

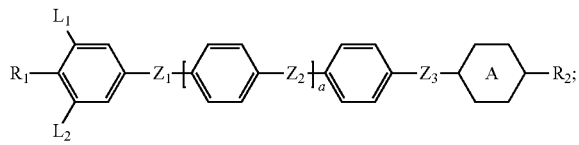
(I)

(2) 5%-85% by weight of one or more compounds of formula (II)

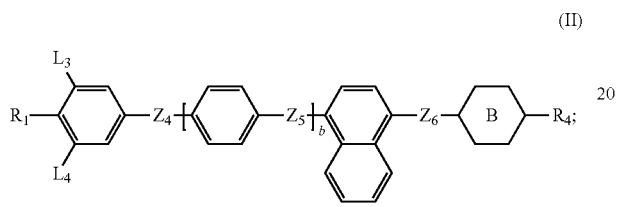
(II)

(3) 0%-95% by weight of one or more compounds of formula (III)

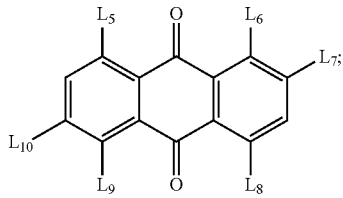
(III)

wherein:
$R_1$ and $R_3$ are the same or different, and are independently selected from the group consisting —H, —F, —NO$_2$, —NH$_2$, —SO$_2$R, —SR, $C_{1-12}$ alkyl and $C_{1-12}$ alkoxy, in which one or more H of the $C_{1-12}$ alkyl and the $C_{1-12}$ alkoxy can be independently substituted by F, and H or the —NH$_2$ can be each independently substituted by $C_{1-12}$ alkyl;

$R_2$ is selected from the group consisting of —H, —F, —NO$_2$, —NH$_2$, —SO$_2$R, —SR, $C_{1-12}$ alkyl and $C_{1-12}$ alkoxy, in which one or more H of the $C_{1-12}$ alkyl and the $C_{1-12}$ alkoxy can be independently substituted by F, and —H of the —NH$_2$ can be each, independently substituted by Ra or Ra'; the Ra and Ra' are the same or different, and independently are $C_{1-10}$ alkyl, in which one or more H of the $C_{1-10}$ alkyl can be independently substituted by F;

$R_4$ is selected from the group consisting of —H, —F, —NO$_2$, —NH$_2$, —SO$_2$R, —SR, $C_{1-12}$ alkyl and $C_{1-12}$ alkoxy; in which one or more H of the $C_{1-12}$ alkyl and the $C_{1-12}$ alkoxy can be independently substituted by F, and H of the —NH$_2$ can be each, independently, substituted by Rb or Rb'; the Rb and Rb' are the same or different, and independently are $C_{1-10}$ alkyl, in which one or more H of the $C_{1-10}$ alkyl can be independently substituted by F;

R is $C_{1-12}$ alkyl with or without halogenation;

$Z_1$, $Z_2$, $Z_3$, $Z_4$, $Z_5$ and $Z_6$ are the same or different, and are independently selected from the group consisting of single bond, —COO—, —OCO—, —N=N—, —CH=N—, —CH=CH—, —CF=CF—, —CF$_2$O— and —C≡C—;

$L_1$, $L_2$, $L_3$ and $L_4$ are the same or different, and are independently selected from the group consisting of —H, —F, $C_{1-12}$ alkyl, and $C_{1-12}$ alkoxy, in which one or more H of the $C_{1-12}$ alkyl, and the $C_{1-12}$ alkoxy can be independently substituted by F;

$L_5$, $L_6$, $L_7$, $L_8$, $L_9$ and $L_{10}$ are the same or different, and are independently selected from the group consisting of hydroxyl, amino, $C_{1-15}$ alkyl, $C_{1-15}$ alkoxy,

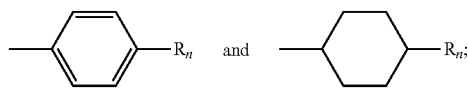

in which H of the hydroxyl and the amino can be each, independently, substituted by

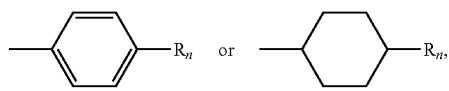

and one or more H of the $C_{1-15}$ alkyl and the $C_{1-15}$ alkoxy can be independently substituted by F or Cl; $R_n$ is selected from the group consisting of $C_{1-15}$ alkyl or alkoxy and $C_{2-14}$ alkenyl or alkynyl, in which one or more H of the $C_{1-15}$ alkyl or alkoxy and the $C_{2-14}$ alkenyl can be each, independently, substituted by F or Cl;

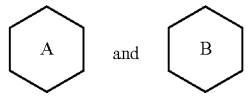

are the same or different, and each, independently, are selected from the group consisting of

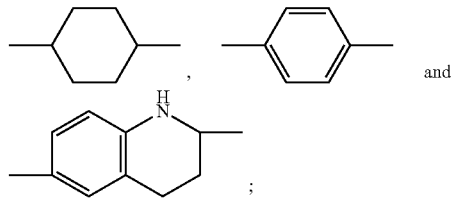

in which one or more nonadjacent —CH$_2$— of the

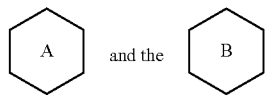

can be independently replaced by O, one or more H of the

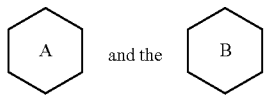

can be independently substituted by halogen or $C_{1-10}$ alkyl; and a and b each are 0, 1 or 2;

an absorbance curve of a guest-host liquid crystal composition containing the dichromatic dye composition within a wavelength range of 420-680 nm having the following characteristics:

a. $2 \leq (T_1+T_2)/\Delta T \leq 10$;

b. $|T_1-T_2| \leq 0.5$;

c. $0 < \Delta T \leq 0.2$;

wherein:

$T_1$ is a difference between a transmittance to light having a wavelength of 420 nm and a minimum transmittance on a transmittance curve;

$T_2$ is a difference between the transmittance at a wavelength of 680 nm and a minimum transmittance on the transmittance curve;

$\Delta T$ is a difference between the maximum transmittance and the minimum transmittance on the transmittance curve within the wavelength range of 420-680 nm.

2. The dichromatic dye composition according to claim 1, wherein any guest-host liquid crystal composition which is formed by the dichromatic dye composition and a different host liquid crystal, has said characteristics, in which the dichromatic dye composition and the host liquid crystal are soluble with each other.

3. The dichromatic dye composition according to claim 1, wherein the compound of formula (I) is one or more compounds selected from the group consisting of the following compounds:

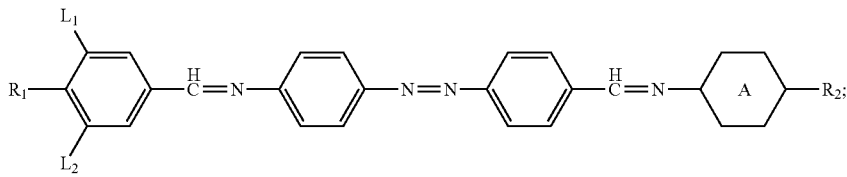
(I-1)

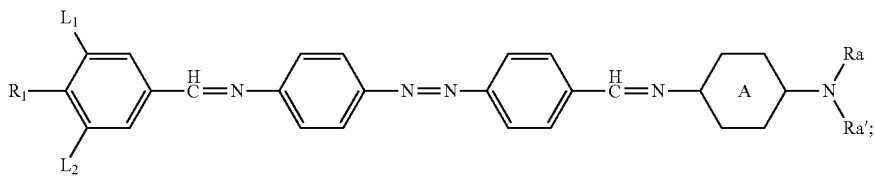
(I-2)

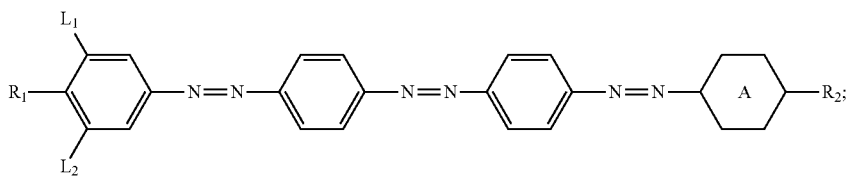
(I-3)

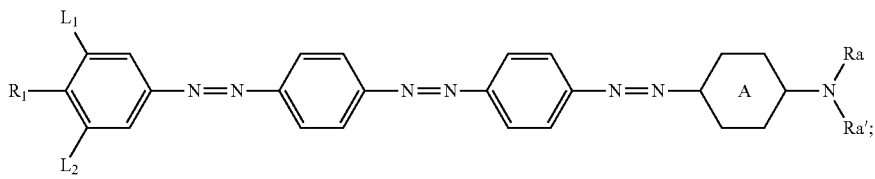
(I-4)

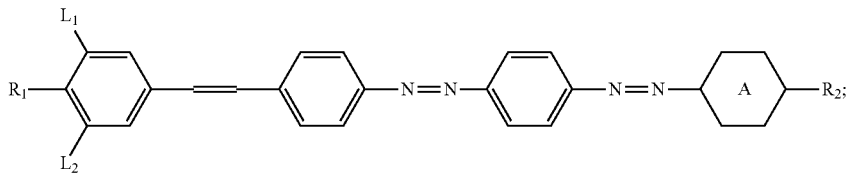
(I-5)

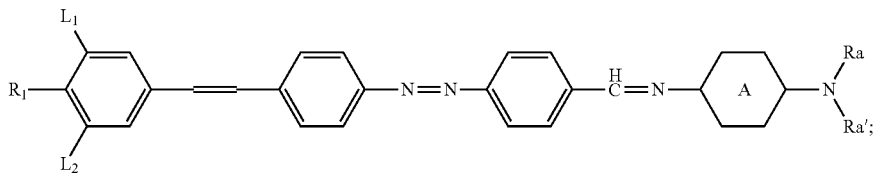
(I-6)

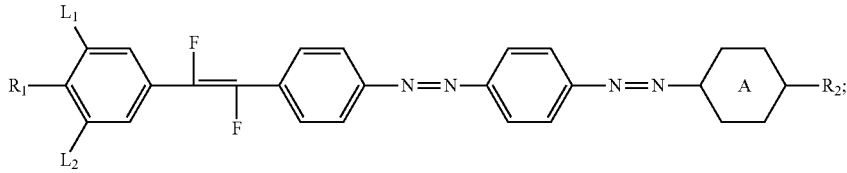

(I-7)

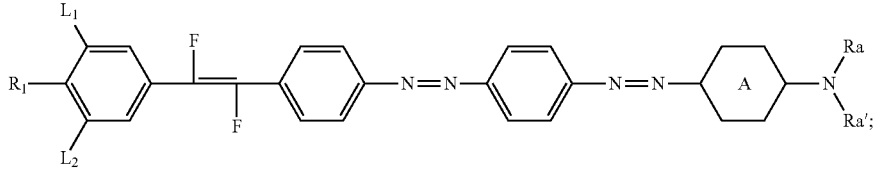

(I-8)

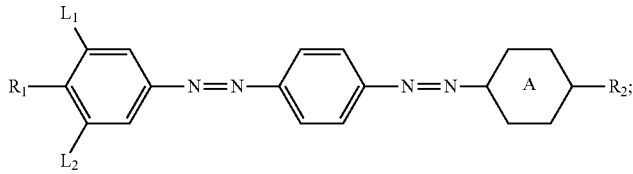

(I-9)

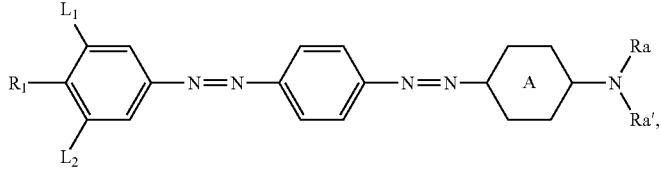

(I-10)

wherein:

R₁ is selected from the group consisting of —H, —F, —NO₂, —NH₂, —SO₂R, —SR, $C_{1-8}$ alkyl and $C_{1-8}$ alkoxy; in which one or more H of the $C_{1-8}$ alkyl and the $C_{1-8}$ alkoxy can be independently substituted by F, and H of the —NH₂ can be each, independently, substituted by $C_{1-8}$ alkyl;

R₂ is selected from the group consisting of —H, —F, —SO₂R, $C_{1-8}$ alkyl and $C_{1-8}$ alkoxy; in which one or more H of the $C_{1-8}$ alkyl and the $C_{1-8}$ alkoxy can be independently substituted by F;

R is $C_{1-10}$ alkyl with or without fluoro-substitution;

Ra and Ra' can be same or different, and each, independently, are $C_{1-8}$ alkyl, in which one or more H of $C_{1-8}$ alkyl can be independently substituted by F;

L₁ and L₂ can be same or different, and each, independently, are selected from the group consisting of —H, —F, $C_{1-6}$ alkyl and $C_{1-6}$ alkoxy; in which one or more H of the $C_{1-6}$ alkyl and the $C_{1-6}$ alkoxy can be independently substituted by F;

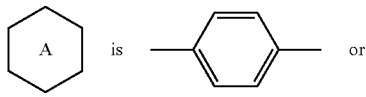

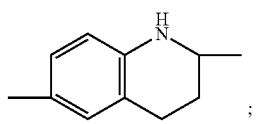

in which one or more H of the

can be independently substituted by F or $C_{1-6}$ alkyl.

4. The dichromatic dye composition according to claim 1, wherein that the compound of formula (II) is one or more compounds selected from the group consisting of following compounds:

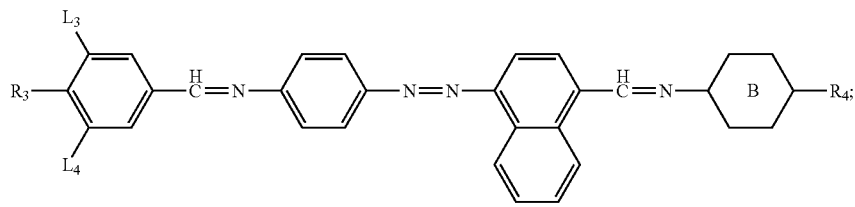 (II-1)
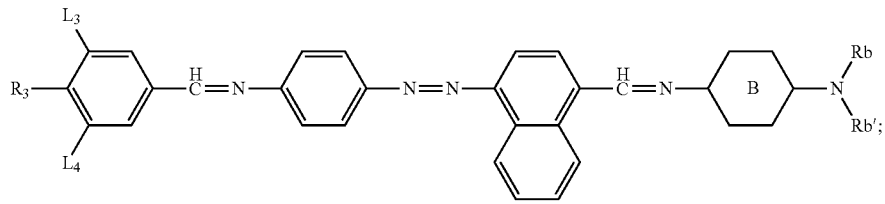 (II-2)
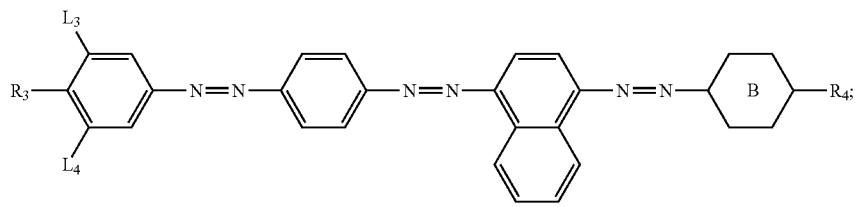 (II-3)
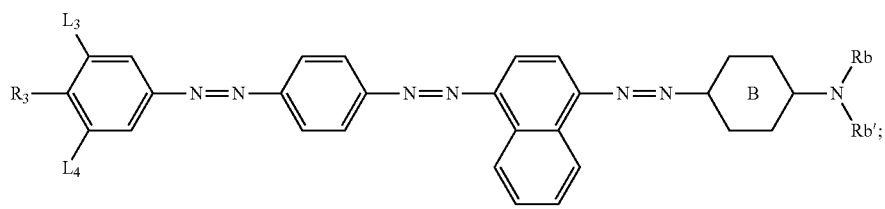 (II-4)
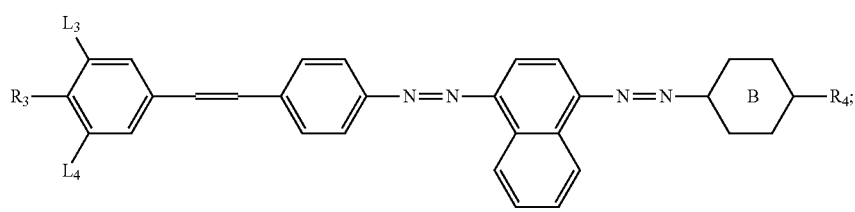 (II-5)
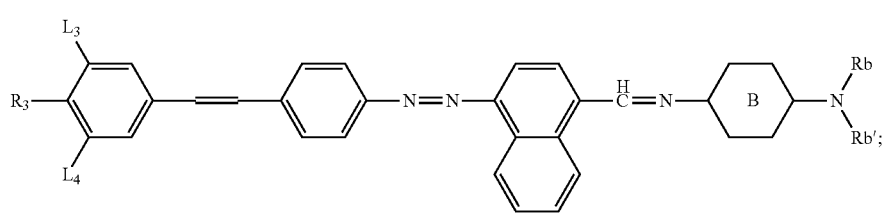 (II-6)
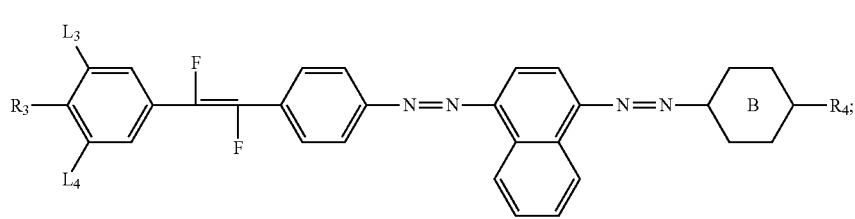 (II-7)

-continued

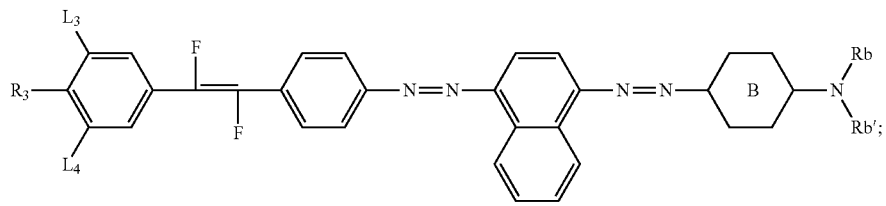
(II-8)

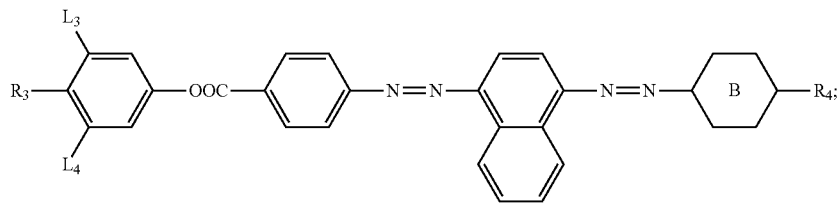
(II-9)

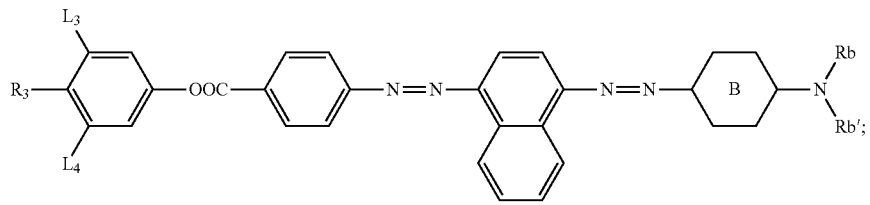
(II-10)

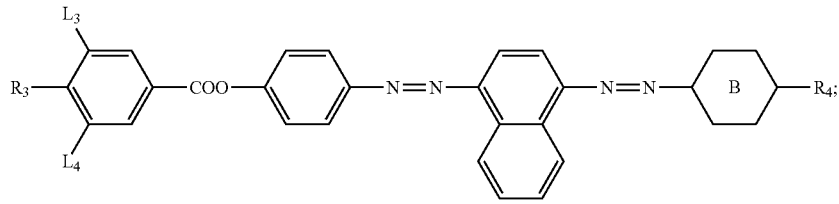
(II-11)

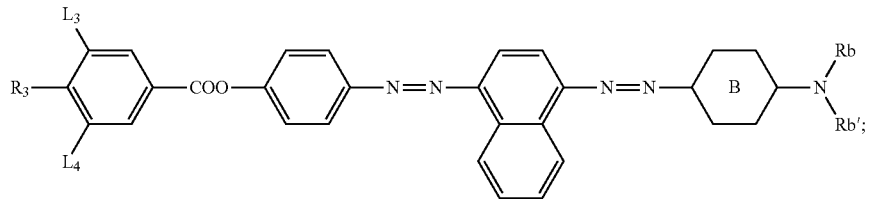
(II-12)

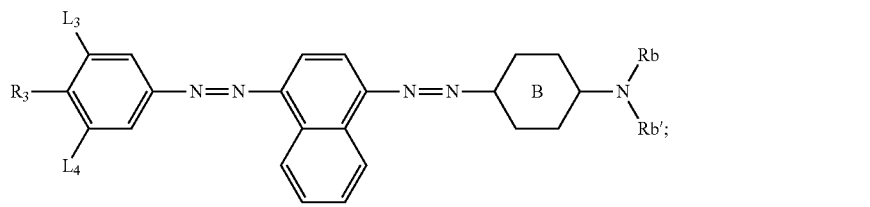
(II-13)

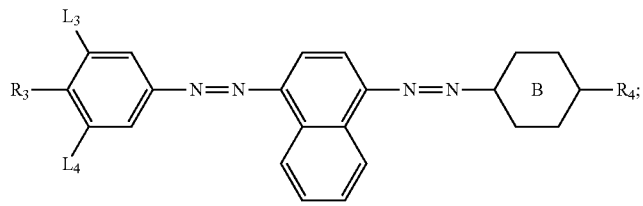
(II-14)

wherein:

$R_3$ is selected from the group consisting of —H, —F, —NO$_2$, —NH$_2$, —SO$_2$R, —SR, $C_{1-8}$ alkyl and $C_{1-8}$ alkoxy; in which one or more H of the $C_{1-8}$ alkyl and the $C_{1-8}$ alkoxy can be independently substituted by F, and H of the —NH$_2$ can each, independently, be substituted by $C_{1-8}$ alkyl;

$R_4$ is selected from the group consisting of —H, —F, —SO$_2$R, $C_{1-8}$ alkyl and $C_{1-8}$ alkoxy; in which one or more H of the $C_{1-8}$ alkyl and the $C_{1-8}$ alkoxy can be independently substituted by F;

R is $C_{1-10}$ alkyl with or without fluoro-substitution;

Rb and Rb' are the same or different, and each, independently, are $C_{1-8}$ alkyl, in which one or more H of $C_{1-8}$ alkyl can be independently substituted by F;

$L_3$ and $L_4$ are the same or different, and each, independently, are selected from the group consisting of —H, —F, $C_{1-6}$ alkyl and $C_{1-6}$ alkoxy; in which one or more H of the $C_{1-6}$ alkyl and the $C_{1-6}$ alkoxy can be independently substituted by F;

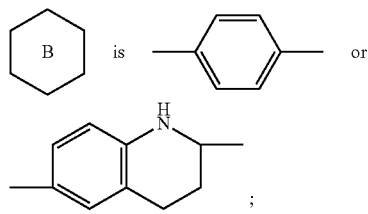

in which one or more H of the

can be independently substituted by F or $C_{1-6}$ alkyl.

5. The dichromatic dye composition according to claim 1, wherein that the compound of general formula (III) is one of more compounds selected from the group consisting of following compounds:

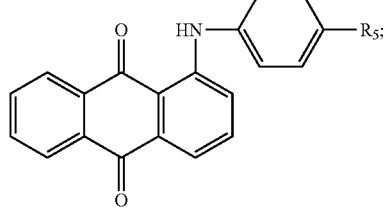
(III-1)

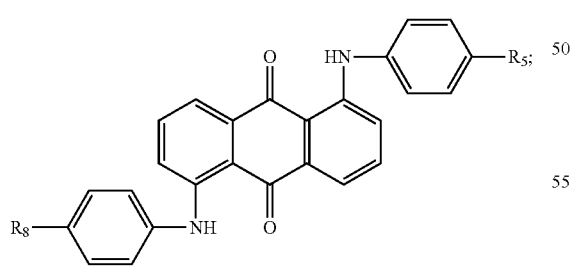
(III-2)

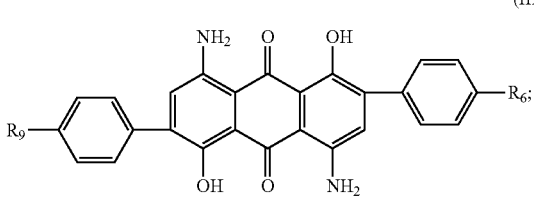
(III-3)

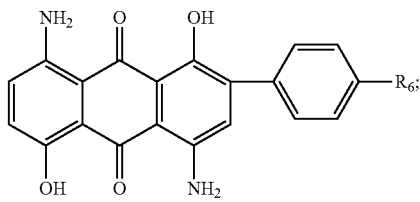
(III-4)

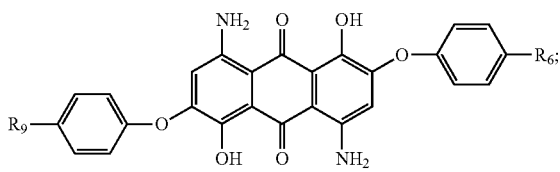
(III-5)

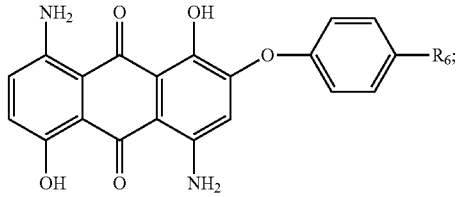
(III-6)

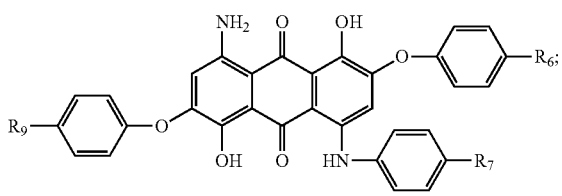
(III-7)

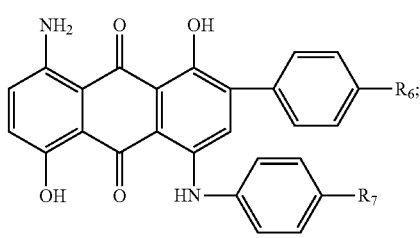
(III-8)

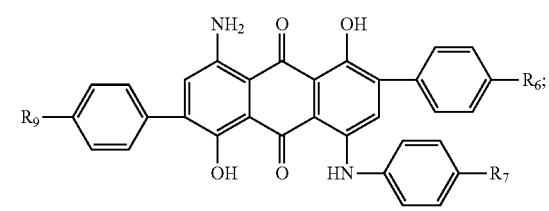
(III-9)

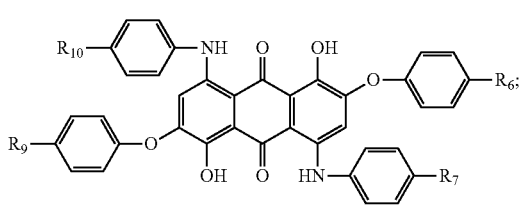
(III-10)

-continued

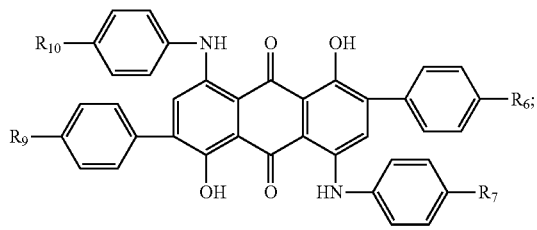
(III-11)

wherein:

$R_5$, $R_6$, $R_7$, $R_8$, $R_9$ and $R_{10}$ are the same or different, and each, independently, are selected from the group consisting of $C_{1-10}$ alkyl, $C_{1-10}$ alkoxy, $C_{2-10}$ alkenyl and $C_{2-10}$ alkynyl.

6. The dichromatic dye composition according to claim 1, wherein the compound of formula (I)

[structure with $L_3$, $L_4$, $R_3$, $R_1$, $Z_1$, $Z_2$, $Z_3$, A, $R_2$, $L_1$, $L_2$]

comprises 0%-40% of the dichromatic dye composition; the compound of formula (II)

[structure with $L_3$, $L_4$, $R_3$, $Z_4$, $Z_5$, $Z_6$, B, $R_4$]

comprises 10%-80% of the dichromatic dye composition; and the compound of formula (III)

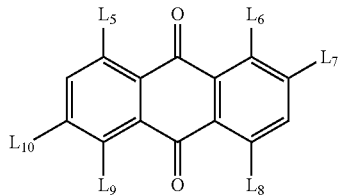

comprises 0%-90% of the dichromatic dye composition.

7. The dichromatic dye compositions according to claim 1, wherein, based on a total weight of the dichromatic dye composition, the composition comprises:

38.1% of the compound of formula (II-1)

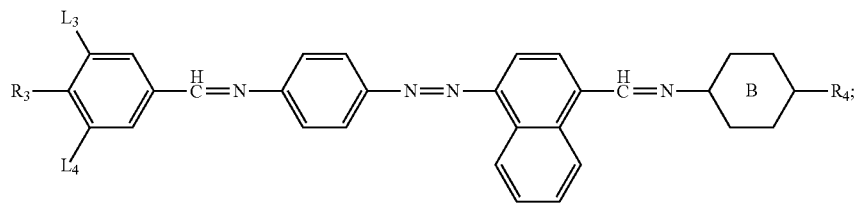

33.3% of the compound of formula (III-1)

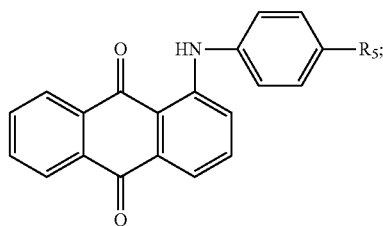

and 28.6% of the compound of formula (III-8)

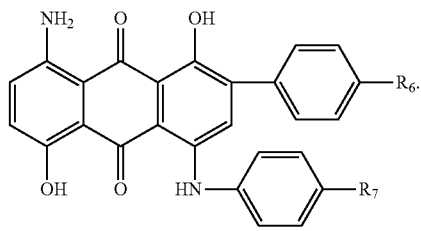

8. The dichromatic dye compositions according to claim 1, wherein, based on a total weight of the dichromatic dye composition, the composition comprises:

20.0% of the compound of formula (II-1)

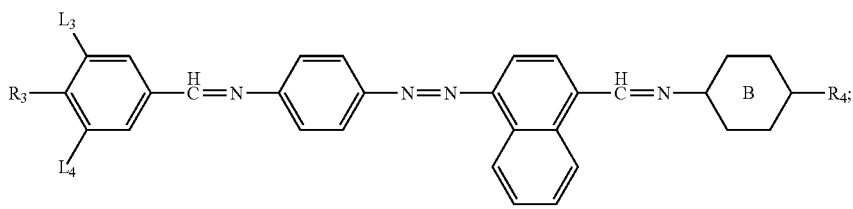

45.0% of the compound of formula (III-5)

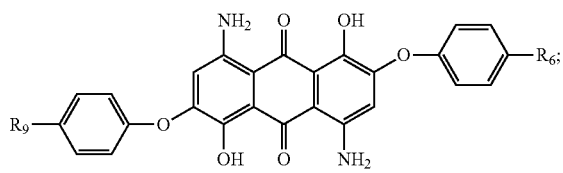

15.0% of the compound of formula (II-13)

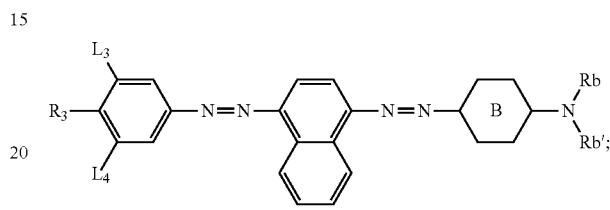

and
55.0% of the compound of formula (II-3)

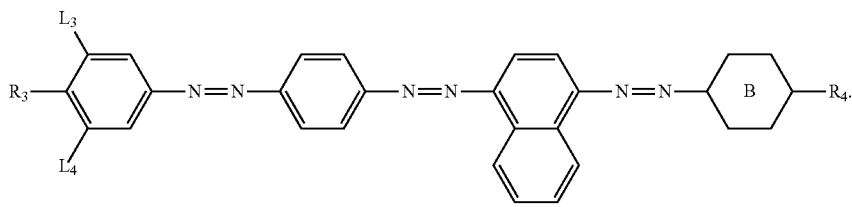

and
35.0% of the compound of formula (III-4)

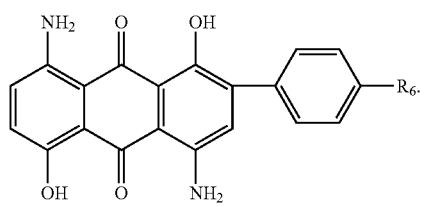

9. The dichromatic dye compositions according to claim 1, wherein, based on a total weight of the dichromatic dye composition, the composition comprises:
30.0% of the compound of formula (I-10)

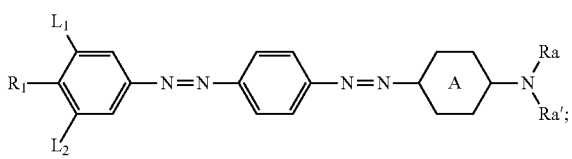

10. A guest-host liquid crystal composition, comprising:
a host liquid crystal;
the dichromatic dye composition according to claim 1 in said host liquid crystal;
said dichromatic dye composition accounting for 0.1-10% of a total weight of the guest-host liquid crystal composition.

11. The guest-host liquid crystal composition according to claim 10, wherein said dichromatic dye composition accounts for 0.5-5% of the total weight of the guest-host liquid crystal composition.

12. The guest-host liquid crystal composition according to claim 11, which further comprises a chiral dopant accounting for 0-5% of the total weight of the guest-host liquid crystal composition.

13. A liquid crystal display device, comprising the guest-host liquid crystal composition according to claim 10.

14. In a method of manufacturing electrode substrates, employing the liquid crystal display device according to claim 13 in the manufacturing of the electrode substrates.

* * * * *